(12) United States Patent
Chuang

(10) Patent No.: US 8,299,717 B2
(45) Date of Patent: Oct. 30, 2012

(54) OUTDOOR LED SYSTEM

(76) Inventor: Yu-Feng Chuang, Bade (TW)

( * ) Notice: Subject to any disclaimer, the term of this patent is extended or adjusted under 35 U.S.C. 154(b) by 348 days.

(21) Appl. No.: 12/698,299

(22) Filed: Feb. 2, 2010

(65) Prior Publication Data

US 2011/0187274 A1 Aug. 4, 2011

(51) Int. Cl.
*H05B 37/02* (2006.01)
(52) U.S. Cl. ............ 315/149; 315/86; 315/155; 315/159
(58) Field of Classification Search .................... 315/86, 315/154, 291, 299, 307, 149, 155, 159, 160; 362/183
See application file for complete search history.

(56) References Cited

U.S. PATENT DOCUMENTS

| | | | |
|---|---|---|---|
| 2008/0037243 A1* | 2/2008 | Discoe et al. | 362/183 |
| 2009/0268441 A1* | 10/2009 | Chen | 362/192 |
| 2010/0090605 A1* | 4/2010 | Nevins | 315/159 |
| 2010/0134014 A1* | 6/2010 | Anderson | 315/113 |

* cited by examiner

*Primary Examiner* — Tung X Le
(74) *Attorney, Agent, or Firm* — Alan Kamrath; Kamrath IP Lawfirm, PA

(57) ABSTRACT

An outdoor LED (light emitting diode) system includes an LED device, a storage battery storing an electric energy therein and connected to the LED device to provide an electric power to the LED device, a solar energy generator connected to the storage battery to provide an electric power to the storage battery, and a wind power generator connected to the storage battery to provide an electric power to the storage battery. Thus, the electric power of the LED device is supplied by two types of natural energy, including the solar energy and the wind energy, to prevent from incurring an environmental pollution so as to satisfy the requirements of environment protection.

13 Claims, 1 Drawing Sheet

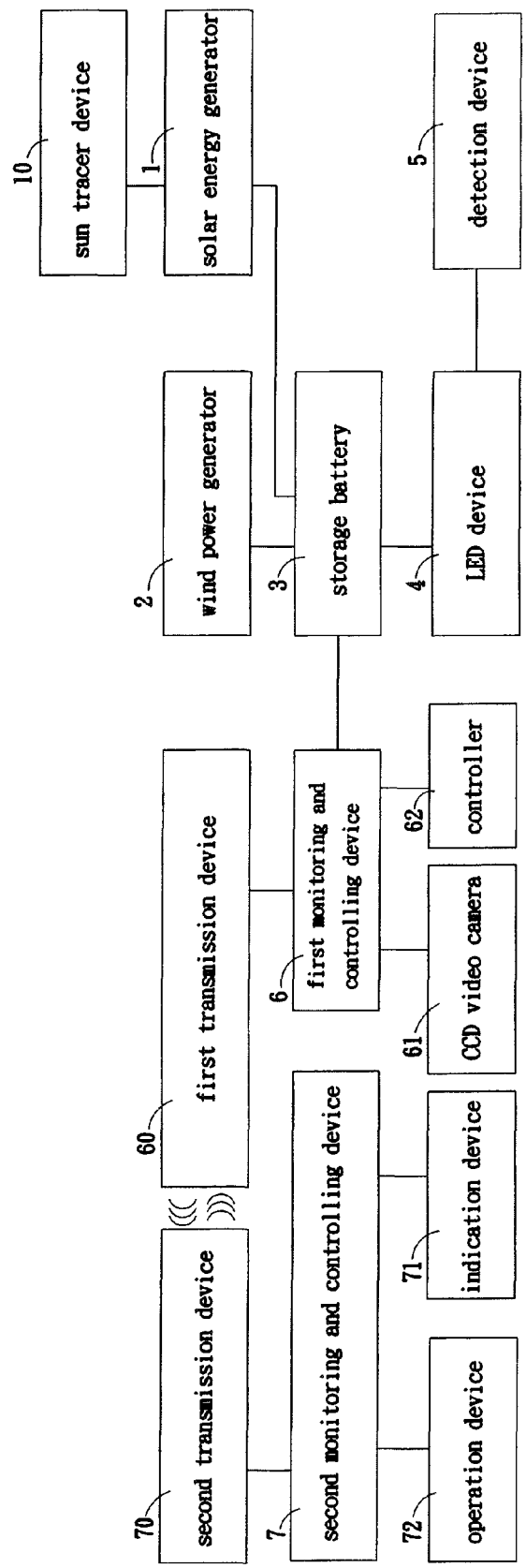

OUTDOOR LED SYSTEM

BACKGROUND OF THE INVENTION

1. Field of the Invention

The present invention relates to an LED (light emitting diode) system and, more particularly, to an outdoor LED system that is used outdoors for providing illumination and indication.

2. Description of the Related Art

A conventional LED device can emit light beams outward to provide an illumination. The LED device has a longer lifetime, saves the electrical energy, has a greater reaction velocity, does not need an idling time, has a smaller volume, does not cause an environmental pollution and has a greater reliability, thereby enhancing its versatility. When the LED device is used outdoors, the LED device can function as a road lamp, an outdoor lamp and the like to provide an illumination. In addition, the LED device can also function as a signal, an indication symbol, a character, a commercial board and the like to provide an indication. However, when the LED device is used outdoors, the power supply to the LED device is not provided successively, thereby limiting utilization of the LED device.

BRIEF SUMMARY OF THE INVENTION

In accordance with the present invention, there is provided an outdoor LED (light emitting diode) system, comprising an LED device, a storage battery storing an electric energy therein and connected to the LED device to provide an electric power to the LED device, a solar energy generator connected to the storage battery to provide an electric power to the storage battery, and a wind power generator connected to the storage battery to provide an electric power to the storage battery.

According to the primary objective of the present invention, the electric power of the LED device is supplied by two types of natural energy, including the solar energy and the wind energy, to prevent from incurring an environmental pollution so as to satisfy the requirements of environment protection.

According to another objective of the present invention, the electric power is supplied to the LED device successively and stably without incurring an electricity interruption.

According to a further objective of the present invention, the outdoor LED system comprises a sun tracer device to enhance the generating efficiency of the solar energy generator.

According to a further objective of the present invention, the wind power generator is a vertical-axis wind turbine to enhance the generating efficiency of the wind power generator.

According to a further objective of the present invention, the storage battery is a lithium iron phosphate battery to enhance the storage efficiency of the storage battery.

According to a further objective of the present invention, the operator in the monitoring and controlling center operates the operation device to monitor the information at the outdoor location of the LED device and to control operation of the LED device in a remote control manner.

Further benefits and advantages of the present invention will become apparent after a careful reading of the detailed description with appropriate reference to the accompanying drawings.

BRIEF DESCRIPTION OF THE DRAWING

FIG. 1 is a block diagram of an outdoor LED system in accordance with the preferred embodiment of the present invention.

DETAILED DESCRIPTION OF THE INVENTION

Referring to FIG. 1, an outdoor LED (light emitting diode) system in accordance with the preferred embodiment of the present invention comprises an LED device 4, a storage battery 3 storing an electric energy therein and connected to the LED device 4 to provide an electric power to the LED device 4, a solar energy generator 1 connected to the storage battery 3 to provide an electric power to the storage battery 3, and a wind power generator 2 connected to the storage battery 3 to provide an electric power to the storage battery 3.

The LED device 4 is used outdoors to provide illumination. For example, the LED device 4 is used to function as a road lamp, an outdoor lamp and the like. Alternatively, the LED device 4 is also used indoors to provide illumination and indication. For example, the LED device 4 is used to function as a signal, an indication symbol, a character, a commercial board and the like. Thus, the electric power of the LED device 4 is supplied by two types of natural energy, including the solar energy and the wind energy, so as to satisfy the requirements of environment protection. In addition, the electric power is supplied to the LED device 4 successively and stably without incurring an electricity interruption. In addition, the LED device 4 can be mounted on a far and high place to enhance the versatility of the LED device 4.

The outdoor LED system further comprises a detection device 5 connected to the LED device 4. The detection device 5 detects variation of an ambient light beam to turn on and off the LED device 4 automatically.

The outdoor LED system further comprises a sun tracer device 10 connected to the solar energy generator 1. The sun tracer device 10 has an angle adjustable function so that the sun tracer device 10 is kept at the optimum angle of incidence of the sun light so as to enhance the generating efficiency of the solar energy generator 1.

In general, the conventional wind turbine includes a horizontal-axis wind turbine and a vertical-axis wind turbine. In the preferred embodiment of the present invention, the wind power generator 2 is a vertical-axis wind turbine which is available a smaller wind power so that even a slight wind can drive the wind power generator 2 to generate the electric power so as to enhance the generating efficiency of the wind power generator 2.

In general, the conventional storage battery is a lithium battery whose positive pole uses a lithium cobalt oxide ($LiCoO_2$) material or a lithium manganese oxide ($LiMn_2O_4$) material. In the preferred embodiment of the present invention, the storage battery 3 is a lithium iron phosphate battery whose positive pole uses a lithium iron phosphate ($LiMPO_4$) material. Thus, the storage battery 3 is used safely, has a higher stability of operation, satisfies the requirements of environment protection, is charged and discharged largely and has a lower price.

The outdoor LED system further comprises a first monitoring and controlling device 6 connected to the storage battery 3, and a first transmission device 60 connected to the first monitoring and controlling device 6. The first monitoring and controlling device 6 is mounted on the practical location of the LED device 4. The first monitoring and controlling device 6 includes a CCD video camera 61 and a controller 62. The CCD video camera 61 has an infrared photographing function to photograph at the night. The controller 62 is connected to the LED device 4 to turn on and off the LED device 4. The first transmission device 60 has a wire or wireless transmission function.

The outdoor LED system further comprises a second monitoring and controlling device 7, a second transmission device 70 connected to the second monitoring and controlling device 7 and connected to the first transmission device 60, an indication device 71 connected to the second monitoring and controlling device 7, and an operation device 72 connected to the second monitoring and controlling device 7. The second monitoring and controlling device 7 is mounted on the monitoring and controlling center. The second transmission device 70 has a wire or wireless transmission function.

When in use, the information of the first monitoring and controlling device 6 at the practical location is transmitted through the first transmission device 60 and the second transmission device 70 into the second monitoring and controlling device 7 and is indicated by the indication device 71. At this time, the operator in the monitoring and controlling center can operate the operation device 72 to monitor the information at the practical location of the LED device 4 and to control operation of the LED device 4 in a remote control manner. For example, the operator in the monitoring and controlling center can operate the operation device 72 to turn on and off an LED road lamp and an LED outdoor lamp, and to change an LED signal, an LED indication symbol, an LED character, an LED commercial board and the like.

Accordingly, the electric power of the LED device 4 is supplied by two types of natural energy, including the solar energy and the wind energy, to prevent from incurring an environmental pollution so as to satisfy the requirements of environment protection. In addition, the electric power is supplied to the LED device 4 successively and stably without incurring an electricity interruption. Further, the outdoor LED system comprises a sun tracer device 10 to enhance the generating efficiency of the solar energy generator 1. Further, the wind power generator 2 is a vertical-axis wind turbine to enhance the generating efficiency of the wind power generator 2. Further, the storage battery 3 is a lithium iron phosphate battery to enhance the storage efficiency of the storage battery 3. Further, the operator in the monitoring and controlling center operates the operation device 72 to monitor the information at the outdoor location of the LED device 4 and to control operation of the LED device 4 in a remote control manner.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An outdoor LED (light emitting diode) system comprising:
    an LED device;
    a storage battery storing an electric energy therein and connected to the LED device to provide an electric power to the LED device;
    a solar energy generator connected to the storage battery to provide an electric power to the storage battery;
    a wind power generator connected to the storage battery to provide an electric power to the storage battery;
    a first monitoring and controlling device connected to the storage battery;
    a first transmission device connected to the first monitoring and controlling device;
    a second monitoring and controlling device;
    a second transmission device connected to the second monitoring and controlling device and connected to the first transmission device;
    an indication device connected to the second monitoring and controlling device; and
    an operation device connected to the second monitoring and controlling device.

2. The outdoor LED system of claim 1, further comprising: a detection device connected to the LED device.

3. The outdoor LED system of claim 2, wherein the detection device detects variation of an ambient light beam to turn on and off the LED device automatically.

4. The outdoor LED system of claim 1, further comprising: a sun tracer device connected to the solar energy generator.

5. The outdoor LED system of claim 4, wherein the sun tracer device has an angle adjustable function so that the sun tracer device is kept at the optimum angle of incidence of the sun light to enhance the generating efficiency of the solar energy generator.

6. The outdoor LED system of claim 1, wherein the wind power generator is a vertical-axis wind turbine.

7. The outdoor LED system of claim 1, wherein the storage battery is a lithium iron phosphate battery.

8. The outdoor LED system of claim 1, wherein the first monitoring and controlling device is mounted on an outdoor location of the LED device.

9. The outdoor LED system of claim 1, wherein the first monitoring and controlling device includes a CCD video camera and a controller.

10. The outdoor LED system of claim 9, wherein the CCD video camera has an infrared photographing function to photograph at night.

11. The outdoor LED system of claim 9, wherein the controller is connected to the LED device to turn on and off the LED device.

12. The outdoor LED system of claim 1, wherein the second monitoring and controlling device is mounted on an indoor location.

13. The outdoor LED system of claim 1, wherein
    an information of the first monitoring and controlling device at an outdoor location is transmitted through the first transmission device and the second transmission device into the second monitoring and controlling device at an indoor location and is indicated by the indication device; and
    the operation device is operated to monitor the information and to control operation of the LED device in a remote control manner.

* * * * *